(12) United States Patent
Yang et al.

(10) Patent No.: US 10,916,862 B2
(45) Date of Patent: Feb. 9, 2021

(54) MULTIFUNCTIONAL SIGNAL TRANSCEIVER

(71) Applicant: SHENZHEN ANTOP TECHNOLOGY LIMITED (CN), Shenzhen (CN)

(72) Inventors: Ruidian Yang, Shenzhen (CN); BoLiang Yang, Shenzhen (CN)

(73) Assignee: SHENZHEN ANTOP TECHNOLOGY LIMITED, Shenzhen (CN)

( * ) Notice: Subject to any disclaimer, the term of this patent is extended or adjusted under 35 U.S.C. 154(b) by 90 days.

(21) Appl. No.: 15/877,950

(22) Filed: Jan. 23, 2018

(65) Prior Publication Data

US 2019/0027840 A1 Jan. 24, 2019

(30) Foreign Application Priority Data

Jul. 20, 2017 (CN) .......................... 2017 1 0616670
Jul. 20, 2017 (CN) ..................... 2017 2 0912802 U

(51) Int. Cl.

| H01Q 21/26 | (2006.01) |
|---|---|
| H01Q 5/30 | (2015.01) |
| H01Q 9/28 | (2006.01) |
| H01Q 21/16 | (2006.01) |
| H01Q 23/00 | (2006.01) |
| H01Q 21/28 | (2006.01) |
| H01Q 1/22 | (2006.01) |
| H01Q 1/24 | (2006.01) |
| H04N 21/44 | (2011.01) |

(Continued)

(52) U.S. Cl.
CPC .......... *H01Q 21/26* (2013.01); *H01Q 1/2291* (2013.01); *H01Q 5/30* (2015.01); *H01Q 9/28* (2013.01); *H01Q 21/16* (2013.01); *H01Q 21/28* (2013.01); *H01Q 23/00* (2013.01); H01Q 1/241 (2013.01); H04N 21/44 (2013.01); H04W 84/12 (2013.01); H04W 88/02 (2013.01)

(58) Field of Classification Search
CPC ........ H01Q 21/26; H01Q 23/00; H01Q 21/28; H01Q 21/16; H01Q 9/28; H01Q 9/0407; H01Q 9/04; H01Q 3/00; H01Q 5/30; H01Q 1/2291
USPC ....................................................... 343/797
See application file for complete search history.

(56) References Cited

U.S. PATENT DOCUMENTS

| 6,023,245 A * | 2/2000 | Gomez | ................ H01Q 9/0407 |
|---|---|---|---|
| | | | 343/700 MS |
| 6,505,054 B1 * | 1/2003 | Douglas | ................ H01Q 1/242 |
| | | | 455/456.3 |

(Continued)

*Primary Examiner* — Hai V Tran
(74) *Attorney, Agent, or Firm* — Muncy, Geissler, Olds & Lowe, P.C.

(57) ABSTRACT

The present invention relates to a multifunctional signal transceiver, comprising a housing, and an antenna assembly and a circuit assembly provided in the housing. The antenna assembly at least comprises a first antenna for receiving a TV signal, a second antenna for receiving and sending a mobile communication signal, and a third antenna for receiving and sending a WIFI signal. The first antenna, the second antenna, and the third antenna are arranged in the housing successively from top to bottom. Compared to prior art, the present invention can receive mobile communication signal, TV signal and WIFI signal.

5 Claims, 6 Drawing Sheets

(51) Int. Cl.
*H04W 84/12* (2009.01)
*H04W 88/02* (2009.01)

(56) References Cited

U.S. PATENT DOCUMENTS

| | | | |
|---|---|---|---|
| 2005/0073465 A1* | 4/2005 | Olson | H01Q 5/42 343/795 |
| 2009/0140921 A1* | 6/2009 | Bongfeldt | H01Q 21/08 342/372 |
| 2014/0191914 A1* | 7/2014 | Ju | H01Q 9/0464 343/727 |
| 2014/0292593 A1* | 10/2014 | Thiam | H01Q 9/0421 343/713 |
| 2015/0236423 A1* | 8/2015 | Yang | H01Q 7/00 343/700 MS |
| 2017/0033449 A1* | 2/2017 | Talty | H01Q 1/3275 |
| 2017/0214112 A1* | 7/2017 | Ohno | H01Q 1/422 |
| 2018/0331714 A1* | 11/2018 | See | H04B 7/0814 |

\* cited by examiner

MULTIFUNCTIONAL SIGNAL TRANSCEIVER

FIELD OF THE INVENTION

The present invention relates to the field of signal communication, and in particular to a multifunctional signal transceiver.

BACKGROUND OF THE INVENTION

In daily life, it is common to communicate through signals, such as TV signal, mobile phone signal, network signal, radio signal, and so on. This also leads to development of various kinds of devices for receiving these signals. However, so far almost all the wireless signal receiving devices are specialized to one specific kind of signals, for example, a TV antenna can only be used to receive TV video signals, a mobile phone can only be used to receive wireless communication signals from a cellular base station, and a radio can only be used to receive wireless audio signals. Based on these different wireless networks, different types of operators have to build different wireless networks, and users also have to purchase different devices to receive the signals. For a user who needs to use a plurality of devices, he has to prepare different devices to receive different signals, such as TV antenna, wireless router, mobile phone, etc., and prepare different network cablings for different devices. This leads to a plurality of intricate independent networks and cablings in a single house, which increases not only the cost of purchasing, but also the cost of repairing and maintenance. In particular, in the case of use in such as a yacht or a caravan, the space that can be used for mounting the above devices is very limited.

In addition, in the case where there are no network signals and thus a user can only use 3G/4G signals as a hotspot, the user needs to set up the mobile phone which may include complex operations. In particular, when indoor or in the wild where the mobile phone cannot receive signals well, the user will not have a good experience. In addition, TV signals are generally transferred to a TV by a cable for playing, in which case, however, only one TV program can be played, and the TV program cannot be played on a intelligent device such as a mobile phone or a tablet PC, which cannot meet various requirements of various users.

SUMMARY OF THE INVENTION

An object of the present invention is to overcome one of the above deficiencies in the art, and provide a multifunctional signal transceiver which can receive different kinds of signals and thus meet daily communication requirements of users, and occupies a small space and is easy to be installed.

This and other objects and advantages of the present invention are achieved by the solutions described herein after. A multifunctional signal transceiver is provided comprising a housing, and an antenna assembly and a circuit assembly provided in the housing. The antenna assembly at least comprises a first antenna for receiving a TV signal, a second antenna for receiving and sending a mobile communication signal, and a third antenna for receiving and sending a WIFI signal. The first antenna, the second antenna, and the third antenna are arranged in the housing successively from top to bottom.

Compared to prior art, the present invention can receive mobile communication signal, TV signal and WIFI signal.

Further, The circuit assembly at least comprises a 4G signal processing module connected respectively with the second antenna and the third antenna. the 4G signal processing module comprises a same frequency combiner, a 4G-to-WIFI module, and a 4G magnification module. The same frequency combiner at least comprises one input end and two output ends, wherein the input end is electrically connected with the second antenna, the two output ends are respectively electrically connected with the 4G-to-WIFI module and the 4G magnification module, and the 4G-to-WIFI module is electrically connected with the third antenna.

4G signals of multiple bands are divided into two outputs after combination of the same frequency combiner. On one hand, this allows devices capable of connecting to WIFI connect to the Internet through the 4G-to-WIFI module and through the third antenna, facilitating a user in the outdoor to connect to the Internet when there are no available WIFI signals, which greatly improves experiences of the user in the outdoor. On the other hand, 4G signals are intermediately transferred through the second antenna that is better in receiving signals compared to an intelligent device such as a mobile phone, and then amplified and output by the 4G magnification module, which enlarges coverage of the 4G signals, allows a user's mobile phone to receive 4G signals and perform normal communication and internet access.

Further, the same frequency combiner has an isolation of more than 40 db, and its two output ends have different impedances.

Signals are divided into two outputs of the same frequency by the same frequency combiner, which makes the 4G-to-WIFI module and the 4G magnification module easily disturb with each other due to the same frequency. In particular, uplink signals amplified in the 4G magnification module will affect receiving sensitivity of the 4G-to-WIFI module, and in severe cases will block the 4G-to-WIFI module. Further, the 4G-to-WIFI module, when its output power reaches 27 dBm, will have a great influence on the low noise filter for the downlink signals of the 4G magnification module. Therefore, it is necessary to optimize and improve the isolation of the same frequency combiner to allow simultaneous proper operation of the 4G-to-WIFI module and the 4G magnification module, meeting both requirements of a user for good mobile signals and smooth internet access. Different impedances of its two output ends also provide better signal isolations, solve the problem of same frequency interference, and ensure proper signal receiving and sending.

Further, the 4G magnification module comprises two combiners, one diplexer, one tetraplexer, and one controller. The controller is respectively electrically connected with the diplexer and the tetraplexer. The output end of the same frequency combiner is electrically connected with one of the combiners. Signals are transferred from this one of the combiners respectively into the diplexer and the tetraplexer, and then out of the other one of the combiners.

In order to provide a smaller volume to occupy a smaller space, one diplexer and one tetraplexer are provided to handle three most commonly used 4G bands, to ensure proper data receiving and sending of these three 4G bands. Compared to conventional 4G magnification modules wherein an intermediate frequency filter is used to solve the problem of isolation of different bands, the present invention provides a combiner having a high isolation to solve the problem of mutual interference between signals, and provides a diplexer having a high out-of-band suppression to improve isolation between uplink signals and downlink signals, and also provides a tetraplexer to solve the problem of overlapping of similar frequencies of commonly used bands. The controller can detect and adjust status of the diplexer and the tetraplexer.

Further, a cross point of an uplink frequency response curve and a downlink frequency response curve of the diplexer has a gain of less than −20 db, and an average suppression to frequencies other than the working frequency is more than 45 db.

The less the gain of the cross point of the uplink frequency response curve and the downlink frequency response curve, the higher the isolation between the uplink frequency and the downlink frequency of the diplexer. A conventional diplexer only has an average suppression to frequencies other than the working frequency of 25 db to 30 db. Since there is same frequency interference between the 4G-to-WIFI module and the 4G magnification module, it is necessary to provide a higher average suppression to other frequencies to ensure proper signal receiving and sending.

Further, the combiner has an out-of-band suppression of more than 45 db, and an insertion loss of less than 1.5 db.

Since signals will be amplified by the 4G magnification module, it correspondingly requires improving suppression to noises. While a convention combiner has an out-of-band suppression of 25 db to 30 db, the combiner of the present invention has an out-of-band suppression of more than 45 db, to further reduce noises in the 4G magnification module. Since during transferring noises will not attenuate but signals will be lost, reduction of insertion loss of the combiner will mean reduction of ratio of the noises in the signals, reducing noise coefficient and ensuring there is no signal distortion.

Further, the second antenna comprises two antennas, each having a shape of cross-shaped inverted cone, and is in a "X X" shaped arrangement.

In such arrangement, dipoles consisting the two antennas each having a shape of cross-shaped inverted cone are provided in a 90° arrangement, avoiding interference between the two antennas to the maximum and improving overall gain.

Further, the antenna having a shape of cross-shaped inverted cone comprises two U-shaped dipoles that are inserted together from up to down, and two side edges of the U-shaped dipole each have a curvature gradually increasing from top to bottom.

The cross-shaped arrangement, i.e., orthogonal arrangement of the two U-shaped dipoles can reduce mutual interference to the maximum. Two side edges of the U-shaped dipole having a curvature gradually increasing from top to bottom can provide a more smooth and wide bottom, wherein the smoothness can prevent signals from forming noises in a tip, and the width can allow the dipole better receive signals. By tests, such arrangement can provide a standing-wave ratio of less than 1.5 in effective bands.

Further, the multifunctional signal transceiver further comprises a WIFI communication module respectively electrically connected with the first antenna and the third antenna.

Such arrangement can allow TV signals received by the first antenna be mixed in the WIFI signals sent by the WIFI communication module through the third antenna, allowing multiple devices play TV programs while surfing the Internet, and allowing different devices play different programs, providing a good convenience and improving user's experience.

Further, the antenna assembly further comprises a fourth antenna located below the third antenna for receiving a VHF and/or DAB and/or FM/AM signal.

The present invention provides the following advantages over the prior art:

In the present invention, a plurality of antennas for receiving various different wireless signals are integrated in a single device, allowing simultaneous uses of TV, mobile phone, wireless mobile terminal and radio, and also providing a base station for building a smart home and mobile traffic, wherein a user do not need to purchase various different devices and cable for each of them, greatly improving convenience in use and in maintenance. A serious of noise reducing and isolating measures are taken by the present invention against the interference between the 4G magnification module and the 4G-to-WIFI module, for example, use of a same frequency combiner having a high isolation, use of a combiner having a high isolation to resolve the problem of mutual interference between signals, use of a diplexer and a tetraplexer having a high out-of-band suppression to improve isolation between uplink signals and downlink signals, cross-shaped inverted cone arrangement of the two antennas, and anti-interference and noise reduction design of the U-shaped dipole, thereby ensuring not only amplified 4G signals to be received by mobile phones, but also WIFI signals transferred from 4G signals to be used by users, further improving convenience.

BRIEF DESCRIPTION TO THE DRAWINGS

DETAILED DESCRIPTION OF THE INVENTION

The present invention will be described in conjugation with embodiments and figures.

Figure 1:
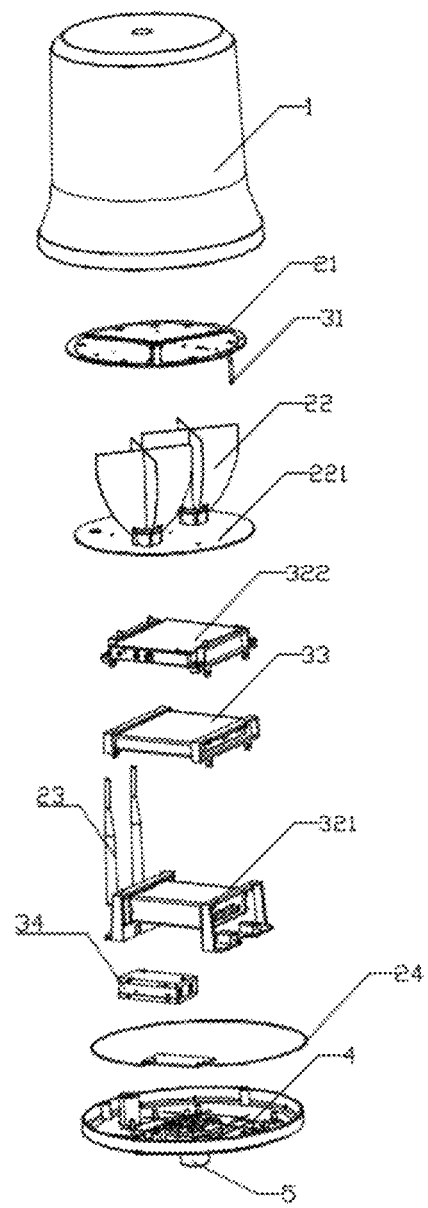
FIG. 1 shows a stereo view of the present invention.

As shown in FIG. 1, a multifunctional signal transceiver is provided, comprising a housing 1, a base 4, and an antenna assembly and a circuit assembly provided in the accommodation space formed by the housing 1 and the base 4. The housing 1 has a truncated cone shape, with a smooth chamfer between its upper surface and side surface, and a smooth transition between a lower part of the side surface and the base 4. The base 4 is provided with an interface 5 at its bottom for connecting the internal antenna assembly and/or circuit assembly with external devices.

The antenna assembly comprises a first antenna 21 for receiving a TV signal, a second antenna 22 for receiving a mobile communication signal, a third antenna 23 for receiving a WIFI signal, and a fourth antenna 24 for receiving a VHF and/or DAB and/or FM/AM signal. In the above accommodation space, the first antenna 21, the second antenna 22, the third antenna 23, and the fourth antenna 24 are arranged successively from top to bottom. A ground reflector 221 is installed below the second antenna 22 for isolation. Since signals can be reflected and accumulated on the ground reflector 221, the ground reflector 221 can also improve receiving sensitivity of respective antennas. In actual experiments, arrangement of the ground reflector 221 can reduce mutual interference by 60%, and improve signal-to-noise ratio of the system.

Figure 2:
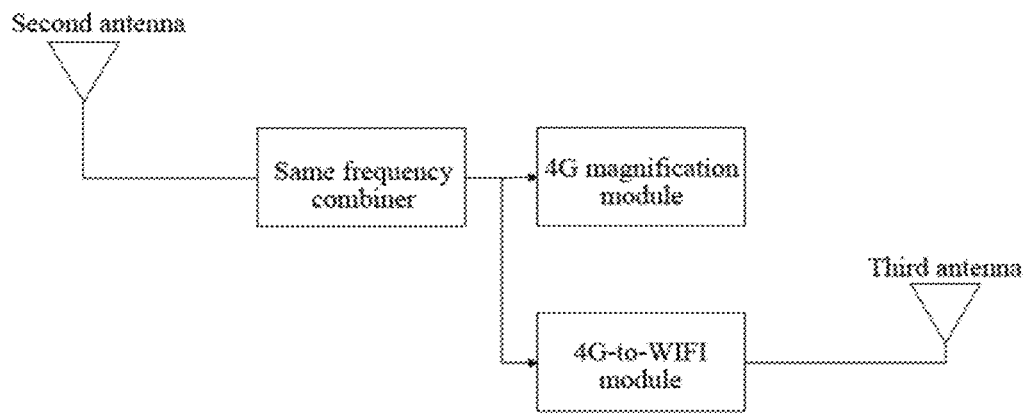
FIG. 2 shows a schematic view of a 4G signal processing module according to the present invention.

The circuit assembly comprises a TV signal feeder 31 electrically connected with the first antenna 21, a 4G signal processing module, a WIFI communication module 33 respectively electrically connected with the first antenna 21 and the third antenna 23, and a low frequency signal receiving box 34 electrically connected with the fourth antenna 24. As shown in FIG. 2, the 4G signal processing module comprises a same frequency combiner whose input end is electrically connected with the second antenna 22, a 4G-to-WIFI module 321 respectively electrically connected with one output end of the same frequency combiner and the third antenna 23, and a 4G magnification module 322 electrically connected with the other output end of the same frequency combiner. According to weight and structure of the above different circuit components, the 4G magnification module 322, the WIFI communication module 33, the 4G-to-WIFI module 321 and the low frequency signal receiving box 34 are arranged successively from top to bottom at the bottom of the accommodation space. Such a structure design can improve stability of the signal transceiver, making it suitable to be used in a moving transportation, such as a yacht or a caravan, etc.

The above circuit structures can also be provided with corresponding signal shielding structures according to their own signal characteristics. For example, the low frequency signal receiving box 34 can be shielded with a tinplate against external wireless signals, and the 4G-to-WIFI module 321 can also be provided with a shielding case.

Figure 3:
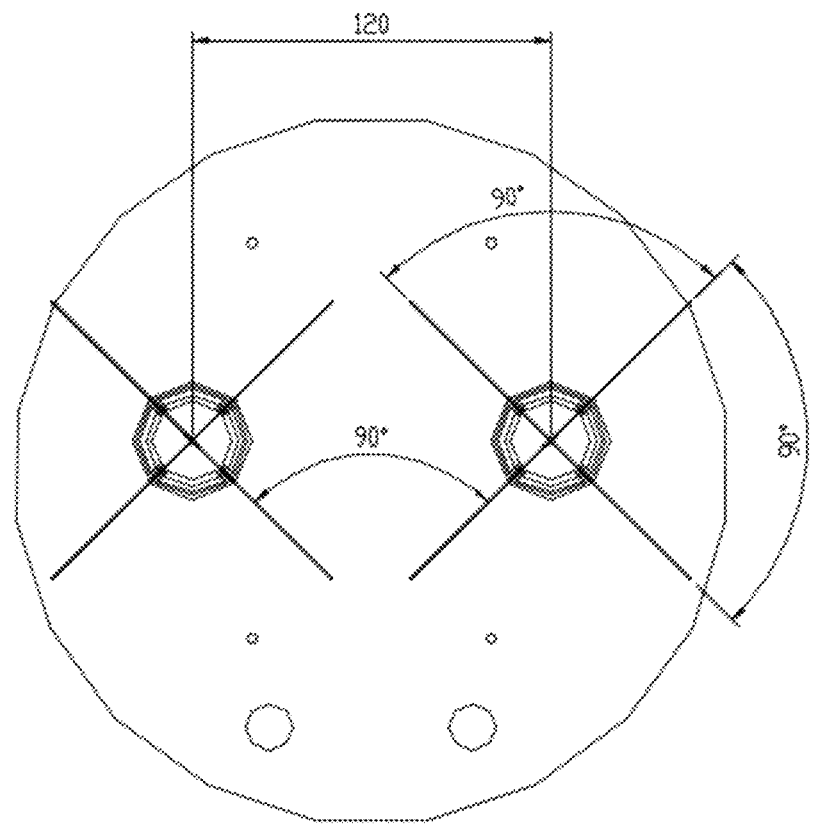
FIG. 3 shows a top view of a second antenna according to the present invention.
Figure 4:
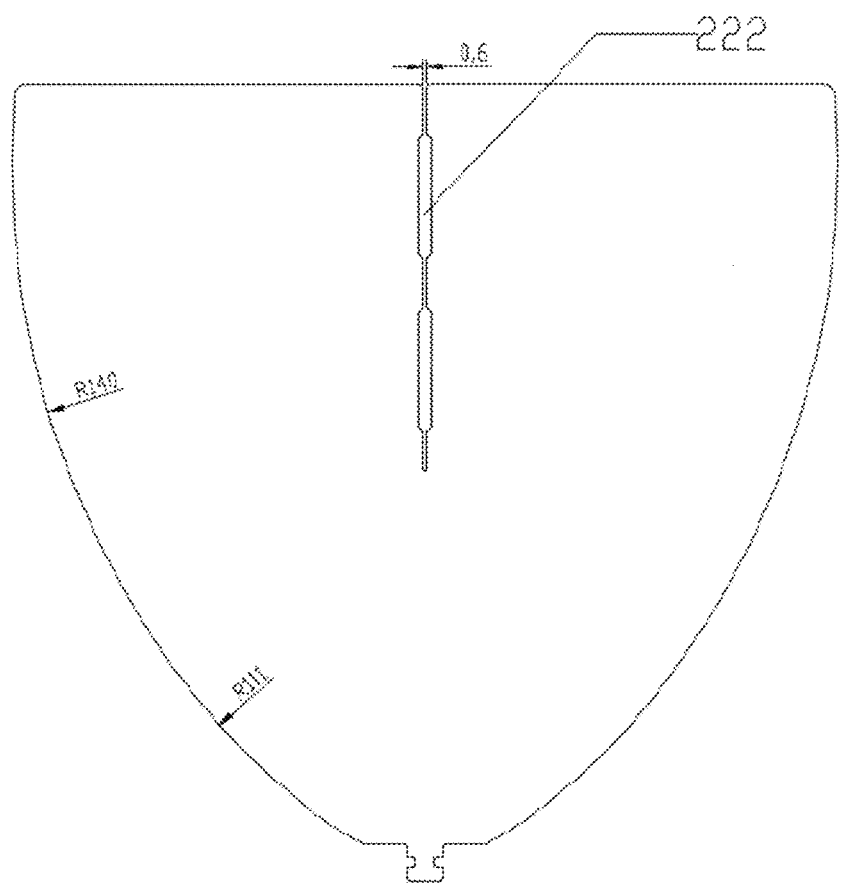
FIG. 4 shows a schematic view of a lower U-shaped dipole according to the present invention.
Figure 5:
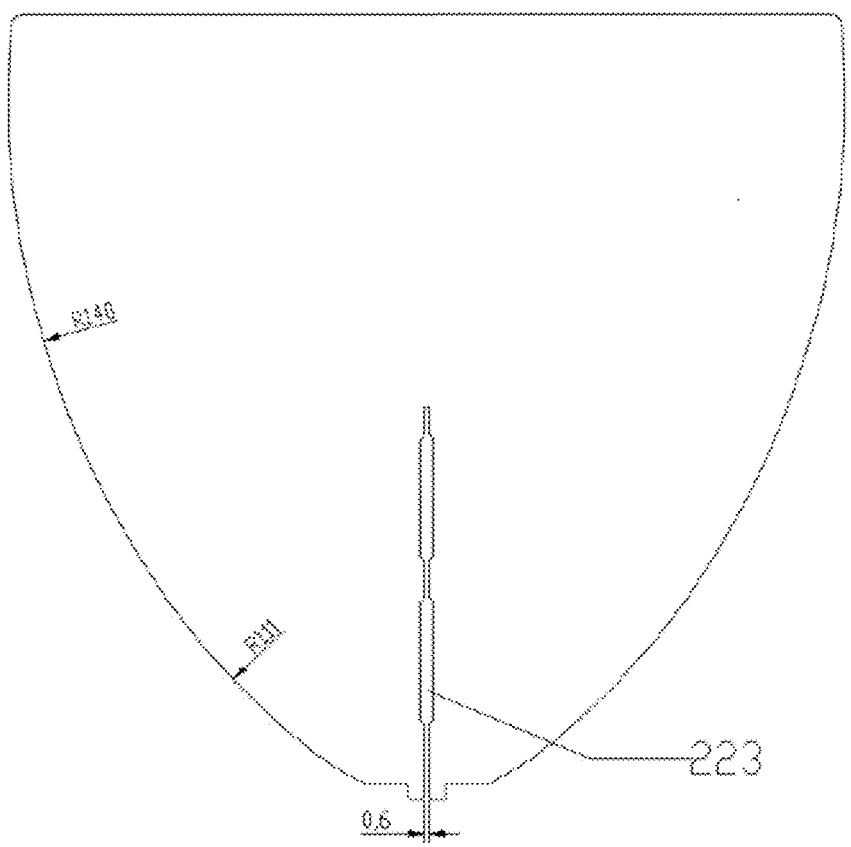
FIG. 5 shows a schematic view of an upper U-shaped dipole according to the present invention.
Figure 6:
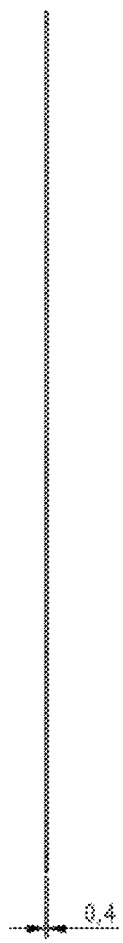
FIG. 6 shows a side view of a U-shaped dipole according to the present invention.
Figure 7:
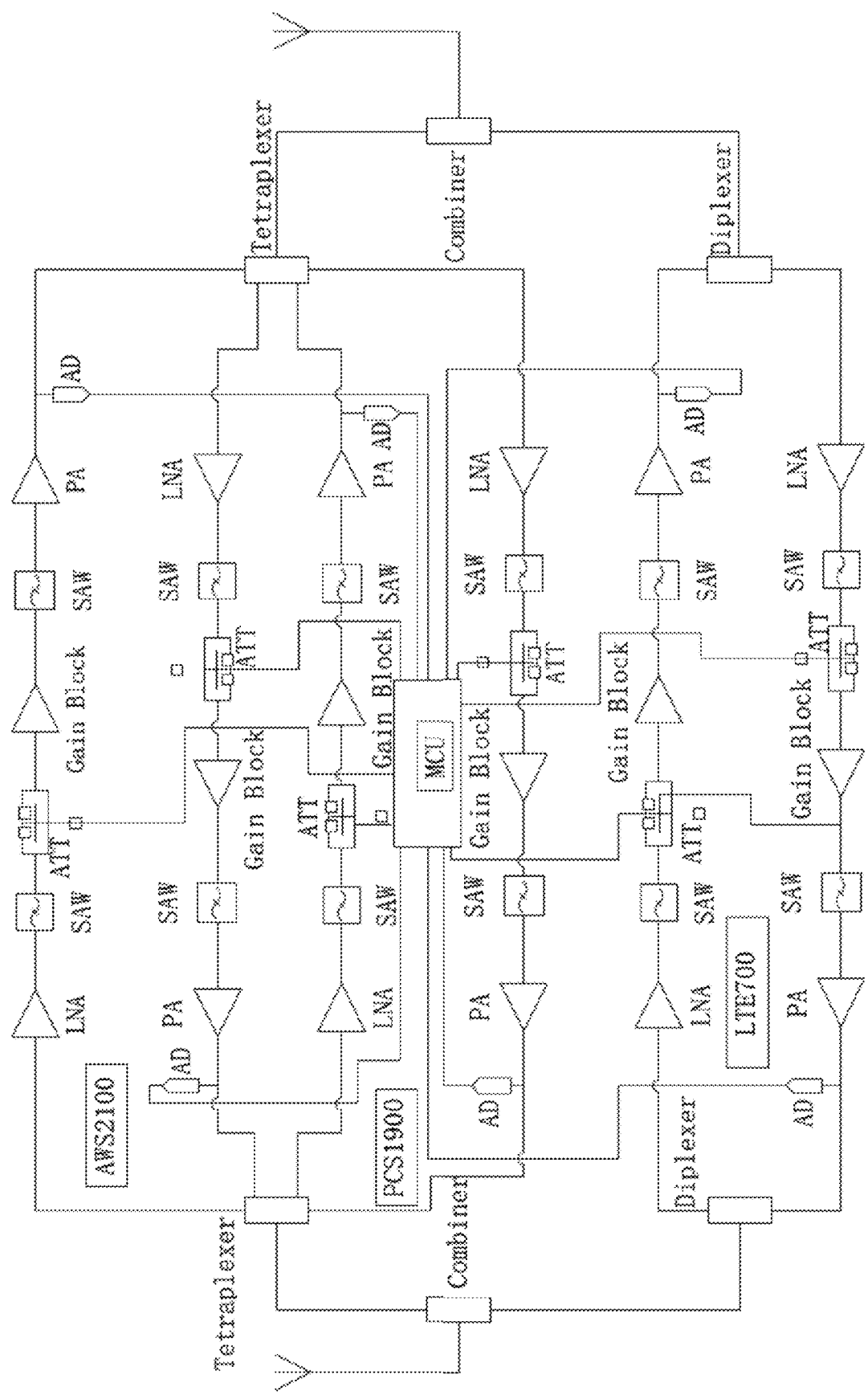
FIG. 7 shows a schematic view of the inner structures of a 4G magnification module according to the present invention.

As shown in FIG. 3, the second antenna 22 is two antennas each having a shape of cross-shaped inverted cone, and is in a "X X" shaped arrangement on the ground reflector 221. Two centers of the two antennas each having a shape of cross-shaped inverted cone are located 120 mm from each other. As shown in FIGS. 4, 5 and 6, the antenna having a shape of cross-shaped inverted cone comprises two U-shaped dipoles that are inserted together from top to bottom, an upper U-shaped dipole and a lower U-shaped dipole, and two side edges of the U-shaped dipoles have a curvature gradually increasing from top to bottom. A first gap 222 is formed from up to down at middle of the upper portion of the lower U-shaped dipole, and a second gap 223 is formed from down to up at middle of the lower portion of the upper U-shaped dipole. The two U-shaped dipoles are inserted into each other by these two gaps. The two gaps both have an opening with a width of 0.6 mm.

The two gaps are both gaps with multiple sections of different sizes, in order to match with full frequency impedance and provide a standing-wave ratio of less than 1.5.

In a specific embodiment, as shown in FIGS. 4, 5 and 6, the U-shaped dipole has an upper portion with a radius of 140 mm, and a lower portion with a radius of 111 mm, and a thickness of 0.4 mm.

Considering both the cost of massive production of the U-shaped dipoles and the stability of two U-shaped dipoles inserted together, it thickness is designed to be 0.4 mm, 0.2 mm smaller than the width of the opening of the gap. Reducing the thickness with respect to the width of the opening of the gap can not only control the cost but also provide certain stability.

As shown in FIG. 4, the 4G magnification module 322 comprises two combiners, one diplexer, one tetraplexer, and one controller. The controller is respectively electrically connected with the diplexer and the tetraplexer. The output end of the same frequency combiner is electrically connected with one of the combiners. Input signals are transferred from this one of the combiners respectively into the diplexer and the tetraplexer, and then out of the other one of the combiners.

In a specific embodiment, in the 4G magnification module 322, the tetraplexer is used for providing transceiver of signals of two similar bands AWS2100 and PCS1900, and the diplexer is used for providing transceiver of signals of LTE700 band. These three bands all have two channels respectively, one for signal uplink and the other one for signal downlink. Each of the channels is provided with respective chamber channel, and is isolated by physical isolation. Further, it is provided in an integrated case formed by die casting of zinc alloy. In this case, two isolating layers are provided between the three bands, and two isolating layers are provided at two sides of the case, making four layers in total, further ensuring that the signals will not disturb other components.

The 4G magnification module 322 can be connected with an indoor antenna by the interface 5, to provide 4G signal magnification and thus facilitate 4G signal receiving of users indoor.

In a specific embodiment, the same frequency combiner is a 3 db chip bridge having the following parameters:

(1) Working frequency:
Band1, Band2, Band3, Band4, Band5, Band7, Band8, Band12, Band13, Band14, Band17, Band20;

(2) Isolation: more than 40 db;

(3) Insertion loss: less than 0.5 db;

(4) Standing-wave ratio: less than 1:1.5;

(5) Comprise four ports Pin1, Pin2, Pin3 and Pin4, impedances of Pin1, Pin2 and Pin4 are all 50Ω, impedance of Pin3 is 100Ω;

(6) Phase of output signal of Pin3 is −90°, phase of output signal of Pin2 is +90°;

(7) Dimension: 4 mm*5 mm*1.5 mm.

The above Pin1 is a signal input port, Pin2 is a signal output port connected with the combiner, Pin3 is a signal output port connected with the 4G-to-WIFI module, and Pin4 is a load port only for connecting with a resistance with a load of 50Ω.

The diplexer comprises a integrated case having a chamber inside which a coating can also be provided to improve conductivity, improving electromagnetic shielding coefficient of the diplexer, avoiding leakage of the signal therein and disturbance to other elements. The diplexer has the following parameters:

(1) Gain of a cross point of an uplink frequency response curve and a downlink frequency response curve of the diplexer: less than −20 db;

(2) Input power: more than 30 dbm;

(3) Insertion loss: less than 3 db;

(4) Standing-wave ratio: less than 1:1.5;

(5) Impedance: 50Ω;

(6) Average suppression to other frequencies: more than 45 db;

(7) Dimension: 2.5 mm*2.0 mm*0.8 mm.

The 4G signal processing module further comprises two microstrip lines for matching input resistances of the 4G-to-WIFI module and the 4G magnification module respectively with resistances of the two different output ends of the same frequency combiner. One of the microstrip lines has the following parameters:

(1) Working frequency:
Band1, Band2, Band3, Band4, Band5, Band7, Band8, Band12, Band13, Band14, Band17, Band20;
(2) Width: 0.6 mm;
(3) Distance to the plane of the PCB plate: 0.5 mm;
(4) Dielectric constant of the PCB plate: 4.2;
(5) Impedance: 50Ω;
(6) Copper thickness: 0.035 mm.

The other one of the microstrip lines has the following parameters:

(1) Working frequency:
Band1, Band2, Band3, Band4, Band5, Band7, Band8, Band12, Band13, Band14, Band17, Band20;
(2) Width: 0.14 mm;
(3) Distance to the plane of the PCB plate: 1.5 mm;
(4) Dielectric constant of the PCB plate: 4.2;
(5) Impedance: 100Ω;
(6) Copper thickness: 0.035 mm.

In a specific embodiment, the combiner is a SAW (surface acoustic wave) combiner having the following parameters:

(1) Working frequency:
Band1, Band2, Band3, Band4, Band5, Band7, Band8, Band12, Band13, Band14, Band17, Band20;
(2) Input power: more than 30 dbm;
(3) Insertion loss: less than 1.5 db;
(4) Standing-wave ratio: less than 1:1.5;
(5) Impedance: 50Ω;
(6) Out-of-band suppression: more than 45 db;
(7) Dimension: 2.0 mm*1.6 mm*0.8 mm.

Position relationships described in the above figures are used for illustrative description only, and cannot be understood to be limitations to the present invention. Obviously, the above examples are merely examples provided for clear illustration of the present invention, but not specific limitations to claims of the present invention. Other different forms of variations or modifications can be made by a skilled person in the art based on the above description. It is neither necessary nor possible to exhaustively make examples for all embodiments. Modifications, equivalent substitutions and improvements made within the spirit and principle of the present invention shall all fall in the scope of the present invention defined by the claims.

The invention claimed is:

1. A multifunctional signal transceiver, comprising:
a housing, an antenna assembly, and a circuit assembly, the antenna assembly and the circuit assembly being provided in the housing,
wherein the antenna assembly at least comprises a first antenna for receiving a TV signal, a second antenna for receiving and sending a mobile communication signal, and a third antenna for receiving and sending a WIFI signal, and
wherein the first antenna, the second antenna, and the third antenna are vertically arranged in the housing and are stacked successively from top to bottom, and
wherein the antenna assembly is independent from the housing.

2. The multifunctional signal transceiver according to claim 1,
wherein the second antenna comprises two antennas each having a shape of cross-shaped inverted cone, and
wherein the two antennas each having the shape of cross-shaped inverted cone are provided in a two adjacent X-shaped arrangement.

3. The multifunctional signal transceiver according to claim 2, wherein one of the two antennas each having the shape of cross-shaped inverted cone comprises two U-shaped dipoles that are inserted together from up to down, and two side edges of the U-shaped dipole each have a curvature gradually increasing from bottom to top.

4. The multifunctional signal transceiver according to claim 1, further comprising a WIFI communication module respectively electrically connected with the first antenna and the third antenna.

5. The multifunctional signal transceiver according to claim 1, wherein the antenna assembly further comprises a fourth antenna located below the third antenna for receiving a VHF and/or DAB and/or FM/AM signal.

* * * * *